Patented Mar. 28, 1950

2,502,286

UNITED STATES PATENT OFFICE 2,502,286

LAMINATED PRODUCTS AND PROCESS FOR PRODUCING THE SAME

Frank J. Sowa, Cranford, N. J.

No Drawing. Application July 25, 1945,
Serial No. 607,096

2 Claims. (Cl. 154—140)

The present invention relates to laminating and in particular to a process for producing laminates and laminated structures and to correlated improvements designed to enhance the structure and functions and to extend the use of such articles.

In the art of lamination by the use of resins, the trade recognizes two types of products produced by a laminating process. The first type is usually termed laminated articles in which plies of wood, glass, fibre board, metal, cloth and the like are adhered together by a layer of resin adhesive or a resin film, but the plies of non-resinous material are not normally penetrated to any substantial extent by the adhesive and the plies maintain their separate identities.

The second class of articles are normally termed laminates and comprise a multiplicity of thin plies of paper, cloth, wood veneer, and the like which are both impregnated and bonded together by a resin mass and in the laminates the resin normally constitutes the major portion of the article and the plies the minor proportion. However, from a practical standpoint the methods of fabrication of these two classes of laminated articles are substantially the same and always involve pressure and generally involve the use of heat with pressure. The recent advances in the construction of airplanes, boats, vehicle bodies and other structures from laminated plywood, and the use of curved safety glass in such structures has created a widespread demand for a resin which will be at one and the same time substantially fire resistant, of high bonding characteristics, substantially waterproof, and in some cases preferably having an inherent flexibility.

Accordingly, it is a general object to provide a process for producing laminated articles which will have great strength and resistance to moisture, fire, decay, and weather.

It is a specific object of the invention to provide a laminate in which the plies are bonded by means of a polymer which is substantially fireproof, waterproof, and resistant to petroleum solvents.

It is a further specific object to provide laminated articles and laminates characterized by a substantial flexibility, high tensile strength, and resistance to fire and moisture.

Other objects of the invention will in part be obvious and will in part appear hereinafter.

In my prior co-pending applications, Serial Nos. 337,833; 419,986; and 422,237, filed respectively, May 29, 1940; November 21, 1941; and December 9, 1941, all now abandoned, I have disclosed for the first time a new series of co-polymers of organo-silicon compounds with each other and with other new silicon containing organic compounds. Among the novel compositions disclosed in said application are adhesive compositions; further in my prior co-pending application, Serial No. 461,892, filed October 13, 1942, now abandoned, I have disclosed for the first time a composition comprising a solid thermo-setting poly organo-siloxane resin plasticised with a liquid non-thermosetting organo-silicon compound, such as the tetra-alkyl silanes and silanes having general formula: $R_ySiX_z$ in which R is alkyl, X is halogen or alkoxy, $y$ has the value 1 or 2, and $z$ has the value 2 or 3, and their corresponding silandiols and poly disiloxanes in which the liquid organo silicon compound serves as a plasticiser for the solid compound.

According to the present invention a laminated structure is produced by uniting plies of material by means of a heat-convertible poly organo-siloxane, and thereafter subjecting the assembled plies to heat and, preferably, to pressure to continue the polymerization of the poly organo-siloxane until it is converted to the solid infusible organo-siloxane resin.

The heat-convertible organo-siloxane employed in the present invention is produced from organo-silanes containing at least two hydrolysable substituents, which silanes have the general formula $R_ySiX_z$ in which "X" is a hydrolysable radical selected from the group consisting of halogen and —OR' radicals, and in which R and R' are organic radicals selected from the group consisting of aliphatic, aromatic, alicyclic and heterocyclic radicals, "$y$" having the value 1 or 2 and "$z$" being 2 or 3. Such silanes are prepared by the Grignard reaction. Thus, the silanes are of two types: $RSiX_3$ and $R_2SiX_2$.

1. The organo-silanes of the type $RSiX_3$ produce on hydrolysis or acidolysis an organo silanetriol, for example,

$$RSiX_3 + 3H_2O \rightarrow RSi(OH)_3 + 3HX$$

The hydrolysis is promoted by the use of mineral acids as catalysts and by heating up to 100° C. The organo silane-triols thus formed polymerize by condensation either spontaneously or by further heating up to 180° C., to form a poly organo-siloxane having the structural unit:

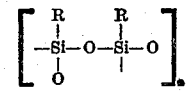

If the condensation is stopped before completion, as by cooling or neutralization, the intermediate polymer will be a solid or liquid adhesive of excellent bonding power, water resistance. The liquid intermediate condensate is thermoplastic but is converted upon continued heating, up to 180° C. to an infusible non-thermoplastic poly organo-siloxane resin which shows excellent heat stability up to 350° C. for long periods of time.

2. Of the organo-silanes of the second type,

R₂SiX₂, I employ only those in which one of the R radicals is a hydrocarbon radical selected from the class consisting of branched-chain aliphatic, unsaturated aliphatic and aromatic hydrocarbon radicals. These are characterized by being converted, on hydrolysis or acidolysis, to the corresponding organo silane-diols, for example, $$R_2SiX_2 + 2H_2O \rightarrow R_2Si(OH)_2 + 2HX$$

Likewise, the conversion is promoted by acid catalysts and by heating up to 100° C. The silane-diols thus formed condense with themselves spontaneously or by heating up to 180° C. to the polyorgano-siloxane having the structural unit:

If the condensation is arrested at an intermediate stage, valuable liquid or solid condensates are produced which are excellent tack adhesives of good bonding power and water-resistance. As in the case of the intermediate condensate formed from the silane-triols, this intermediate is initially thermoplastic but is heat-convertible to a water-resistant, non-tacky, poly siloxane resin.

The hydrolysis of the silane is readily effected in the case of the lower aliphatic members by merely mixing with an excess of water and in the case of the higher members by heating the mixture with an excess of water up to 100° C. Acid substances promote the hydrolysis and suitable agents are hydrochloric, sulfuric, phosphoric, ammonium bifluoride and the like. Alkalis such, for example, as ammonium, sodium, and potassium hydroxides also act as catalysts.

The silane-diols and silane-triols may also be produced from the silanes by acidolysis, for example, by heating the silane with an excess of the molecular equivalent of organic acid such, for example, as acetic, lactic, citric, or the like whereupon a reaction takes place according to the following equation:

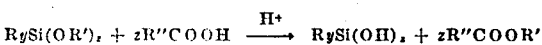

This reaction can be carried out even in the absence of water by heating the mixture in a reflux in the presence of acid substances and then distilling off the volatile ester produced.

By way of illustrating but not by way of limiting the invention, there will be given the following examples of suitable silanes for use in the invention. Among the silanes of the type RSiX₃ there may be mentioned trimethoxy ethyl silane, triethoxy methyl silane, tributoxy amyl silane, trimethoxy allyl silane, triethoxy phenyl silane. Also, from 1 to 3 halogen atoms may be substituted for the alkoxy groups in the above-mentioned examples. Thus, one can use monomethyl trichloro silane, monoethyl dichloro monoethoxy silane, monoamyl monochloro dibutoxy silane, and the like. Of the silanes of the type R₂SiX₂, there may be used compounds in which "X₂" represents 1 halogen and 1 alkoxy or 2 halogen atoms or 2 alkoxy groups, and the R₂ may be di isopropyl, di isobutyl, di secondary butyl, di methallyl, di allyl, ethyl tolyl, di phenyl, phenyl tolyl, and phenyl xylyl; more specifically, isobutyl difluorosilane, isopropyl methyldibromsilane, amylallyldichlorosilane, methyl secondary butyl dimethoxysilane, phenyl amyltrichlorosilane, monomethallyloctodecyldichlorosilane, methallylphenyldiethoxysilane, and the like. The adhesive composition may be varied as follows:

Instead of using a single silane, there may be used (a) mixtures of two or more of the silanes of same or different type, so that the cured polysiloxane resin will be a copolymer of the different silanes. Further, there may be used (b) copolymers of a silane of either type with a non-silicon containing organic compound, for example, with cellulose esters, cellulose ethers, synthetic resins or resin-forming compounds such as urea and formaldehyde, vinyl chloride, styrene, butadiene, and the like. (c) Further, two or more separated condensed poly organosiloxanes of the type above described may be mixed, used, and cured together; and (d) the poly organosiloxanes may also be mixed with compatible known adhesives, especially with heat-curing intermediate condensates of urea - formaldehyde, phenol - formaldehyde, melamine-formaldehyde, and the like, and the mixture used and cured together. The use of mixtures and copolymers is advantageous for obtaining a wider range of solubility, viscosity, tackiness, and thermal curing conditions because one can vary (1) the nature of the ingredients, (2) the the ratio thereof and (3) the extent of polymerization.

The adhesive may be applied by spraying, painting or dipping. Any volatile solvent is evaporated and the assembled plies are then subjected to the curing operation to convert the poly organosiloxane to the infusible state. The curing is effected in general by heat, which can be applied by direct heating means, by infra-red radiation or induction heating. The rate of condensation of the siloxanes silanols depends in part on the size of the organic radical in the silanol. The lower alkyl compounds condense very rapidly and spontaneously, even without heating. The higher members and the aryl derivatives condense by heating from 100° C. to 200° C. Time is also a factor and the longer the time the lower the temperature required. The presence of oxygen greatly accelerates the cure. The curing time and temperature may both be decreased by using a catalyst, for example, mineral acids, such for example, as hydrochloric, sulfuric, phosphoric, and the like, and/or by the use of a drier, such for example, as lead soaps, such as lead naphthenate, lead resinate and lead linoleate, and the like. Such catalysts and driers should not be added until the thermoplastic condensate is ready for use. When desired, pressure may be used during the cure to promote bonding, shaping, and molding of the laminated structure.

To the adhesive composition, there is preferably added a plasticizer for the intermediate tacky polyorgano siloxane. The plasticizers are those commonly employed having plasticized cellulose esters such, for example, as dibutyl phthalate, tricresyl phosphate, diamyl phenol, tributyl citrate.

However, I have found that many advantages arise from plasticizing the intermediate polyorgano-siloxane, used as the adhesive base, with a liquid organo-silicon compound which is relatively non-thermosetting so that the final adhesive film comprises a solid nontacky substantially cured polysiloxane plasticized with a liquid substantially uncured organo-silicon compound. Thus, the preferred embodiment of my adhesive composition comprises a heat-convertible polyorganosiloxane and a plasticizer therefor comprising a liquid, non-heat-convertible, organo-silicon compound selected from the group consisting of (a) tetra alkyl silanes, (b) tri-alkyl monoalkoxy silanes, (c) mono and di-fluoro-alkyl silanes, in which the sum of the carbon atoms in the alkyl groups exceeds 7, (d) tri-alkyl silanols, (e) alkyl silicyl ethers, (f) di and tri-alkyl silicon hydrides, and (g) di-alkyl siloxanes, in which alkyl is straight chain aliphatic group. Omitting the fluorides of class (c) above, examples of the other compounds are, for example, the methyl, ethyl, butyl, propyl compounds, that is, it is preferred to use the lower members of the aliphatic series. Of the fluorides of class (c), there may be given by way of example: monofluorotributyl silane, monofluorotriamyl silane, difluorodibutyl silane difluorobutylamyl silane, difluorodiamyl silane and the like.

There is preferably added to the composition an agent to augment the tackiness which is a tacky material selected from the class consisting of natural or artificial resins and gums, and oxidizing vegetable oils such, for example burgundy pitch, rosin, ester gum, gum dammar, gum elemi, gum mastic, unvulcanized rubber, and also soft coumar resins, soft alkyd resins, also linseed oil, rape seed oil, soya bean oil, and the like.

If desired, dyes may be used, pigment or dye may be added to the adhesive composition or backing material itself. Pigmenting may be accomplished by such material as Prussian blue and mineral pigments.

The zinc oxide filler, when used, serves as a reinforcing pigment imparting greater coherency and firmness to the adhesive coating. Colored pigments likewise function as reinforcing pigments and thus have a function in addition to that of coloring the adhesive.

All of the ingredients of the adhesive composition are dissolved in a volatile solvent, the solvent having been selected with regard to the nature of the ingredients. Generally speaking, the composition is soluble in a mixture of esters, chlorinated hydrocarbons and aromatic hydrocarbons.

By way of illustration but not by way of limiting the invention, the following specific examples will be given.

Example I 170 grams monamyl triethoxy silane, 90 grams acetic acid, 3 drops H₂SO₄ refluxed together until ethyl acetate was formed and distilled off leaving a viscous liquid comprising a mixture of amyl silantriol and poly amyl siloxanes. The product was neutralized, as with soda ash or ammonia. Plies of fibrous material, such, for example, plies of wood were coated with this liquid as an adhesive, the plies superimposed and heated to 150° C. at 10,000 lbs./sq. in. pressure for 30 minutes whereupon the organo-silicon adhesive was converted to a solid poly amyl siloxane which was tough, strong, and water resistant.

Example II

The mixture of amyl silane triol and poly amyl siloxane produced according to Example I was heated to 180° to advance the polymerization until a thermoplastic solid was formed, and after neutralization, the solid was plasticized with 10 per cent of liquid polydiethyl siloxane and the mixture dissolved in ethyl acetate. This composition was applied to sheets of asbestos paper and the superimposed sheets heated to 200° C. for 20 minutes under 15,000 lbs./sq. in. to cure the resin and form a flexible heat resistant laminate.

Example III

Seventy grams of di-isopropyl diethoxy silane mixed with 60 grams propionic acid and 5 drops sulphuric acid and heated until all the ethyl propionate formed was driven off to leave a tacky thermoplastic solid comprising a mixture of di-isopropyl silandiol and poly isopropyl siloxane. The product was neutralized and mixed with 2 per cent lead naphthenate as a drier. Two layers of nylon fabric were laminated together, using three parts solid dissolved in a mixture of equal parts ethyl acetate and toluene, at 120° C. and 5,000 pounds pressure per square inch for ten minutes.

Example IV 100 grams dimethallyl diethyoxy silane mixed with 100 grams water and 10 grams of 10 per cent hydrochloric acid. Mix and warm for 70 minutes and neutralize and then distill off water under reduced pressure to leave a thermoplastic solid comprising dimethallyl silandiol and poly dimethallyl siloxane. The product was mixed with 20 per cent tri cresyl phosphate and dissolved in trichlorethylene. This adhesive was used to laminate together sheets of mica.

I claim:

1. A laminated sheet material comprising a plurality of plies of material bonded together by an adhesive layer comprising a substantially cured thermosetting silicone having the empirical formula RR'SiO, in which formula R is a hydrocarbon radical and R' is a hydrocarbon radical selected from the class consisting of branched-chain aliphatic, unsaturated aliphatic and aromatic hydrocarbon radicals, the silicone being plasticized with a material selected from the group consisting of the monofluoro alkyl silanes and the difluoro alkyl silanes in which the sum of the carbon atoms in the alkyl groups exceeds seven.

2. A process for producing laminated materials comprising adhering plies of material together with a layer of adhesive comprising a silicone having the empirical formula RR'SiO, in which formula R is a hydrocarbon radical and R' is a hydrocarbon radical selected from the class consisting of branched-chain aliphatic, unsaturated aliphatic and aromatic hydrocarbon radicals, said silicone being plasticized with a material selected from the group consisting of the monofluoro alkyl silanes and the difluoro alkyl silanes in which the sum of the carbon atoms in the alkyl groups exceeds seven, and thereafter heating said silicone to advance the polymerization thereof.

FRANK J. SOWA.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,258,222 | Rochow | Oct. 7, 1941 |
| 2,371,050 | Hyde | Mar. 6, 1945 |
| 2,390,370 | Hyde | Dec. 4, 1945 |
| 2,436,777 | Pletcher | Feb. 24, 1948 |

Certificate of Correction

Patent No. 2,502,286   March 28, 1950

FRANK J. SOWA

It is hereby certified that error appears in the printed specification of the above numbered patent requiring correction as follows:

Column 2, line 50, for the indistinct subscript following the closing bracket, read $_s$;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*